United States Patent

Walton et al.

Patent Number: 5,782,715
Date of Patent: Jul. 21, 1998

[54] DUAL RATIO VISCOUS FAN DRIVE

[75] Inventors: Erlen B. Walton, Farmington; James R. DeBrabander, Marshall; David P. Godlew, Beverly Hills, all of Mich.

[73] Assignee: Eaton Corporation, Cleveland, Ohio

[21] Appl. No.: 705,351

[22] Filed: Aug. 29, 1996

[51] Int. Cl.⁶ ................................................. F16H 47/08
[52] U.S. Cl. ........................ 475/48; 475/51; 192/58.61
[58] Field of Search ........................... 475/72, 78, 80, 475/82, 91, 31, 48, 51, 92, 93; 192/58.5, 58.6, 58.61, 58.67, 58.683

[56] References Cited

U.S. PATENT DOCUMENTS

| | | | |
|---|---|---|---|
| 4,040,310 | 8/1977 | Giroux | 475/48 |
| 4,351,425 | 9/1982 | Bopp | 192/58.61 |
| 4,407,401 | 10/1983 | Rosendahl . | |
| 4,476,744 | 10/1984 | Crooks | 475/289 |
| 4,658,671 | 4/1987 | Martin . | |
| 4,706,521 | 11/1987 | Anderson et al. | 475/146 |
| 4,932,928 | 6/1990 | Crockett | 475/51 |
| 4,974,712 | 12/1990 | Brown | 192/58.61 |
| 4,987,985 | 1/1991 | Meckstroth et al. . | |
| 5,152,384 | 10/1992 | Brown | 192/58.61 |
| 5,203,747 | 4/1993 | Warren | 475/72 |
| 5,558,192 | 9/1996 | Muhlbach et al. | 192/58.61 |

Primary Examiner—Rodney H. Bonck
Assistant Examiner—Peter T. Kwon
Attorney, Agent, or Firm—L. J. Kasper

[57] ABSTRACT

A fan drive assembly includes a viscous coupling device (11), a radiator cooling fan (F), and a speed increasing mechanism (13), so that, at relatively low engine speeds, the fan (F) is driven at a speed ("overdrive") greater than the input speed to the coupling device (11), and at relatively higher engine speeds, the input torque is transmitted through the viscous coupling in the normal manner. In the subject embodiment, the speed increasing mechanism (13) is a planetary gear set, in which torque is transmitted from the input shaft (21) to the planet carrier (47), and in the overdrive condition, the sun gear (53) is grounded. The output of the planetary is the ring gear (59), which directly drives a housing (61) attached to both the housing (17) of the viscous coupling, as well as the cooling fan (F), thus effectively bypassing the viscous clutching action.

26 Claims, 6 Drawing Sheets

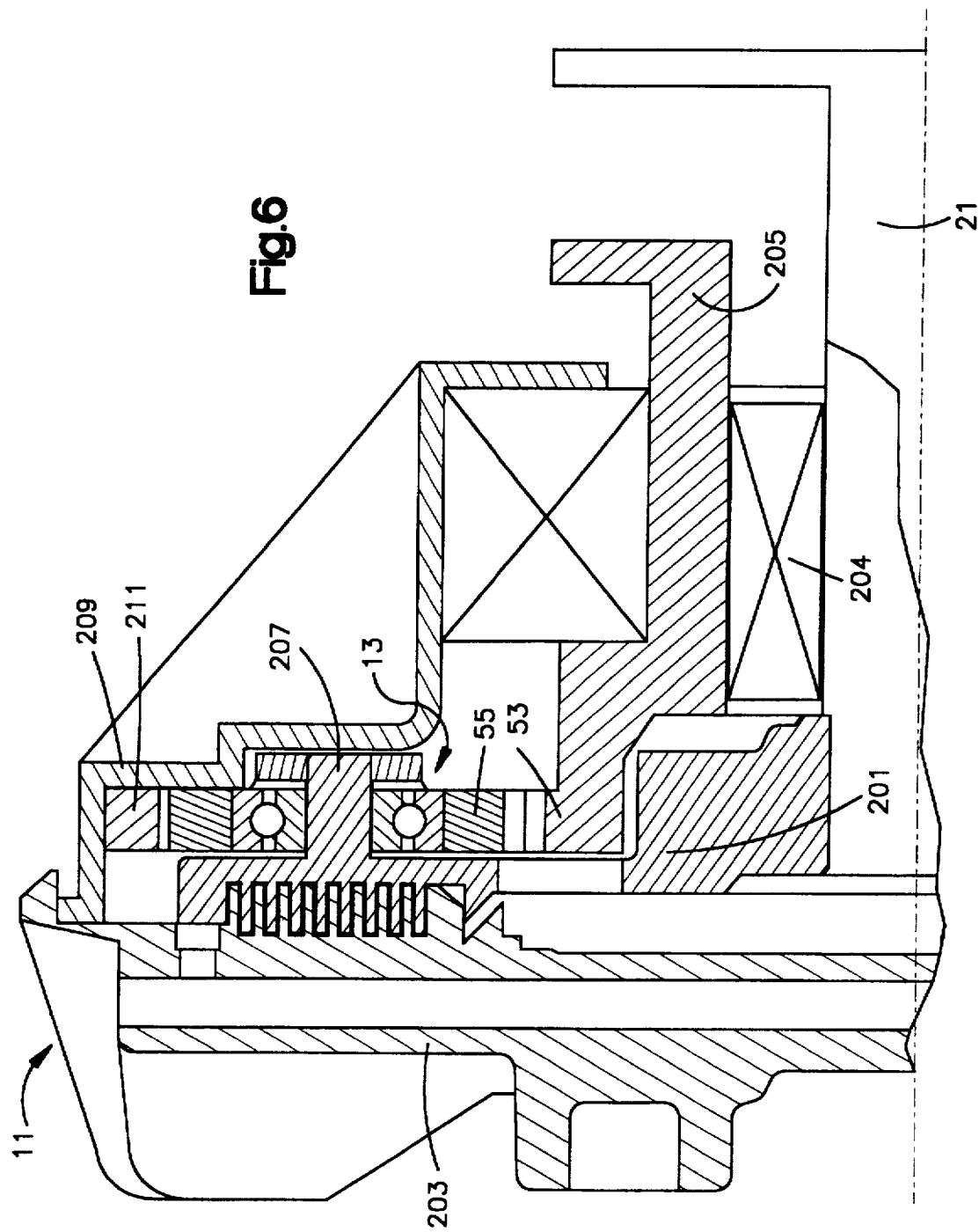

ically on vehicles such as automobiles and light trucks. The use of such viscous couplings has been widespread, and quite desirable, because such couplings can operate in either an engaged condition, or a disengaged condition, depending upon a sensed temperature, such as ambient air temperature behind the radiator.

DUAL RATIO VISCOUS FAN DRIVE

BACKGROUND OF THE DISCLOSURE

The present invention relates to viscous fluid couplings, and more particularly, to such couplings which are capable of operation at two different ratios of output speed to input speed.

Viscous fluid couplings have been in commercial use for many years to drive the vehicle radiator cooling fan, especially on vehicles such as automobiles and light trucks. The use of such viscous couplings has been widespread, and quite desirable, because such couplings can operate in either an engaged condition, or a disengaged condition, depending upon a sensed temperature, such as ambient air temperature behind the radiator.

In an increasing number of vehicle applications, it has become desirable to increase the capability of the viscous fluid coupling to move air through the radiator when the vehicle engine is operating at a relatively low speed, such as engine idle. In such applications, it is typically desirable for the fan to operate at a speed greater than that at which it would be driven by the engine ("overdrive"), at engine idle, but it is still desirable for the fan to operate at a slightly lower ratio, as engine speed increases, and finally, to operate at a substantially lower ratio at relatively higher engine speeds.

In spite of this need for a fan drive having such an "overdrive" capability (i.e., drive ratio greater at relatively low engine speeds), as of the date of the present application, there are apparently no commercially available viscous couplings capable of operating at different ratios of output speed to input speed. More specifically, there are apparently no commercially available viscous couplings capable of operating at an output speed which is greater than the input speed.

SUMMARY OF THE INVENTION

Accordingly, it is an object of the present invention to provide an improved viscous fluid coupling which is capable of operating at a relatively high output speed-to-input speed ratio at relatively low input speeds, while operating at a relatively lower output speed-to-input speed ratio at relatively higher input speeds.

It is a more specific object of the present invention to provide an improved viscous fluid coupling device which can achieve the above-stated object by bypassing the viscous coupling, and directly overdriving the output of the coupling device at relatively low input speeds.

The above and other objects of the invention are accomplished by the provision of an improved fluid coupling device of the type including a first rotatable coupling member defining an axis of rotation, and a fluid chamber therein. The fluid chamber comprises a fluid operating chamber, and a second rotatable coupling member is disposed in the fluid operating chamber, and is rotatable relative to the first coupling member to transmit torque thereto in response to the presence of viscous fluid in the fluid operating chamber. An input means is in driving relationship with the second coupling member and is operable to transmit input torque thereto.

The improved fluid coupling device is characterized by speed increasing gear means including an input portion in driven relationship with the input means. The speed increasing gear means further includes an output portion in driving relationship with the first rotatable coupling member. Actuation means for the speed increasing gear means has a first, actuated condition in which the speed increasing gear means transmits input torque from the input means to the first rotatable coupling member at a speed of rotation greater than that of the input means. The actuation means also has a second, unactuated condition in which substantially all input torque is transmitted from the input means to the second rotatable coupling member.

BRIEF DESCRIPTION OF THE DRAWINGS

FIG. 6 is an enlarged, fragmentary axial cross-section, similar to FIGS. 2 and 5, illustrating another alternative embodiment of the present invention.

DESCRIPTION OF THE PREFERRED EMBODIMENT

Figure 1:
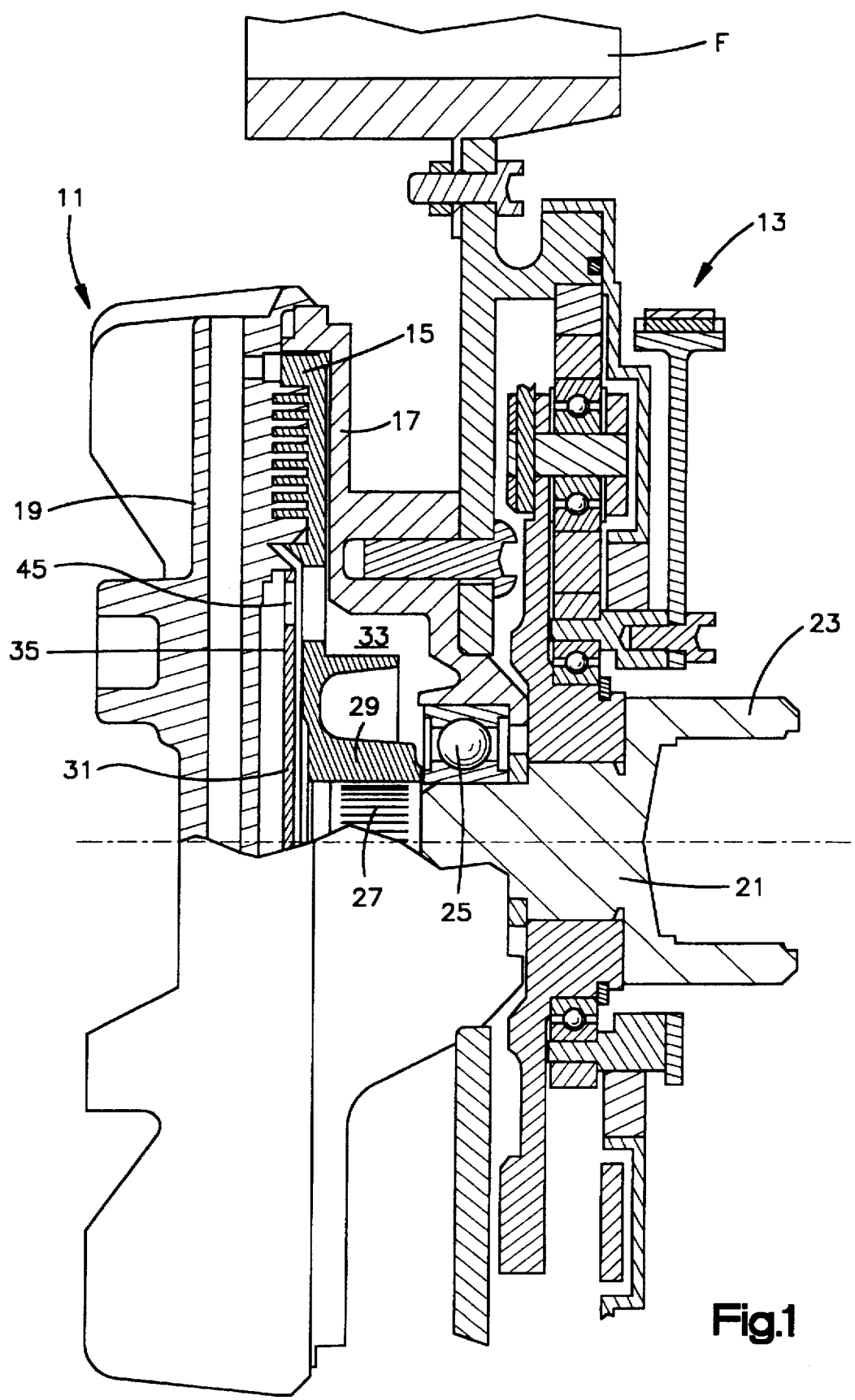
FIG. 1 is a fragmentary axial view, partly in cross-section and partly in plan view, of a typical fluid coupling device including the present invention.

Referring now to the drawings, which are not intended to limit the invention, FIG. 1 illustrates one preferred form of a fluid coupling device (viscous fan drive) including the present invention. The fluid coupling device illustrated in FIG. 1 may be viewed generally as including three different portions, including a fairly conventional fluid coupling device, generally designated 11, a speed increasing mechanism, generally designated 13, and a radiator cooling fan F (shown only fragmentarily). Although the present invention is illustrated and described in connection with driving the radiator cooling fan F, it will be understood that the use of the present invention is not so limited.

The fluid coupling device 11 includes an input coupling member 15, and an output coupling assembly including a die cast housing member 17 and a die cast cover member 19, the members 17 and 19 being secured together, such as by a rollover of the outer periphery of the cover member 19, as is well known in the art.

The fluid coupling device 11 includes an input shaft 21 on which the input coupling member 15 is mounted. The input shaft 21 is rotatably driven, typically by means of an externally threaded shaft (not shown) which is driven by the engine, and which is in threaded engagement with an internally threaded hexagonal portion 23. The input shaft 21 functions as a support for the inner race of a bearing set 25, which is seated on the inside diameter of the housing member 17. The forward end (left end in FIG. 1) of the input shaft 21 has an interference fit between a serrated or knurled portion 27 and an opening defined by a hub portion 29 of the input coupling member 15. As a result, rotation of the input shaft 21 causes rotation of the input coupling member 15.

The housing member 17 and the cover member 19 cooperate to define a fluid chamber which is separated, by means of a circular valve plate 31, into a fluid operating chamber 33 and a fluid reservoir chamber 35, such that the input coupling member 15 is disposed within the operating chamber 33.

Typically, the cover member 19 defines a generally cylindrical shaft support portion (not shown in FIG. 1), and rotatably disposed within the shaft support portion is a valve shaft (not shown), extending outwardly (to the left in FIG. 1) through the cover member 19.

Attached to the inner end (right end in FIG. 1) of the valve shaft is a valve arm (not shown), and operatively associated with the outer end of the valve shaft is a temperature responsive bimetal element, comprising a coil member (not shown). As is well known to those skilled in the art, changes in ambient air temperature change the shape of the coil member, thus moving the valve arm and controlling the flow of fluid from the reservoir chamber 35 to the operating chamber 33, through a fill opening 45 formed in the valve plate 31. The portions of the fluid coupling device 11 illustrated and described up to this point may be better understood by reference to U.S. Pat. No. 4,974,712, assigned to the assignee of the present invention and incorporated herein by reference.

Figure 2:
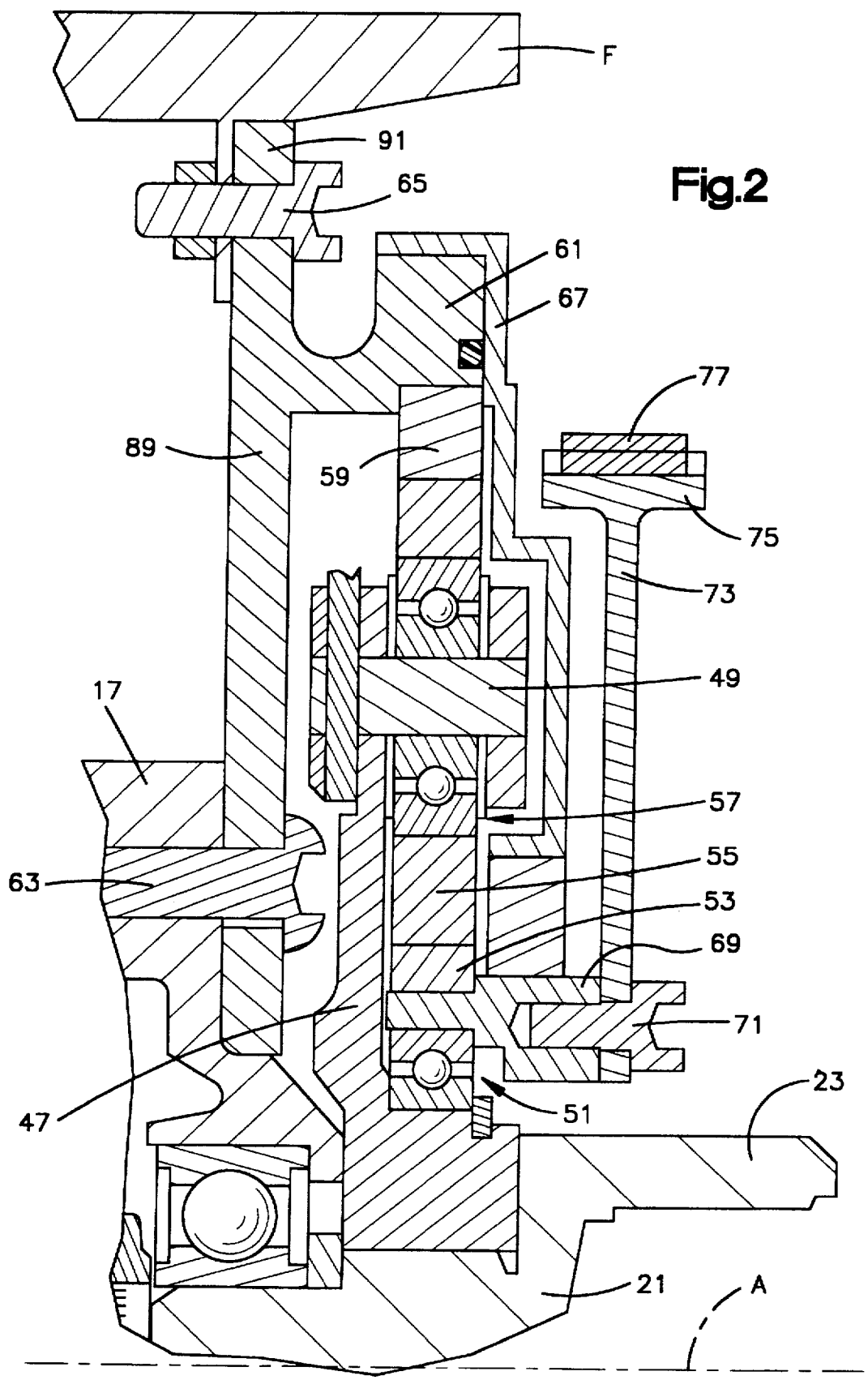
FIG. 2 is a fragmentary, enlarged axial cross-section, similar to FIG. 1, of the speed increasing gearing of the present invention.
Figure 3:
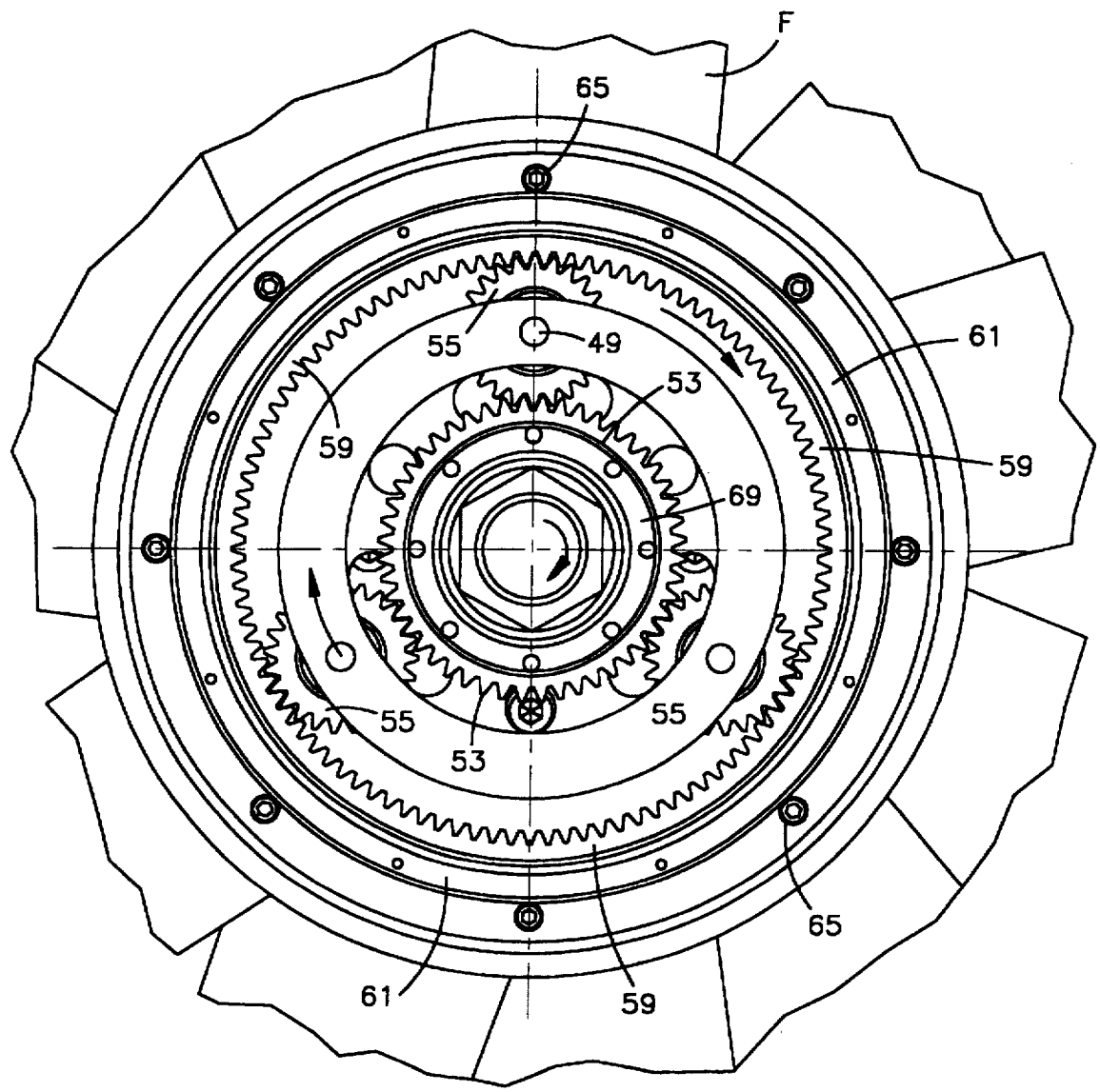
FIG. 3 is a transverse cross section, looking from the right in FIG. 1, but on a smaller scale than FIG. 1, with certain parts remove to illustrate the speed increasing gearing of the present invention.

Referring now primarily to FIGS. 2 and 3, the speed increasing mechanism 13 will be described in some detail. In the subject embodiment, and by way of example only, the speed increasing mechanism 13 comprises a planetary gear set, although those skilled in the art will understand that the invention is not so limited.

Disposed about the input shaft 21, just forward of the hexagonal portion 23, is an annular planet carrier assembly, including a planet carrier member 47, which is fixed to the input shaft 21, and a plurality of planet carrier pins 49, fixed to the planet carrier 47. Disposed about the radially inner hub of the planet carrier 47 is a bearing set 51, and mounted concentrically about the bearing set 51 is a sun gear 53. The sun gear 53 is in toothed engagement with a plurality of planet gears 55, each of the planet gears 55 being rotatably mounted on its respective planet carrier pin 49, and supported thereon by a suitable bearing set 57.

Each of the planet gears 55 is in toothed engagement with a set of teeth disposed about the interior of a ring gear 59. The ring gear 59 is fixed to rotate with a housing member 61, as by any of several suitable means. It is one important aspect of the present invention that the housing member 61 is attached to the housing member 17 of the fluid coupling device 11, as by a plurality of bolts 63, and at the same time, is attached to the cooling fan F, as by means of a plurality of bolts 65. The significance of this aspect of the invention will become apparent in connection with the subsequent description of the operation of the invention.

Referring still primarily to FIG. 2, the mechanism 13 includes a stamped cover member 67 (which is removed in FIG. 3 to show the gears) which is attached to the housing member 61, and extends radially inwardly, such that the various gear meshes are enclosed, and protected from dirt, contamination, etc. Disposed radially between the bearing set 51 and the sun gear 53, and fixed to rotate with the sun gear 53 is an annular grounding member 69 which is attached, by means of a plurality of bolts 71, only one of which is shown in FIG. 2, to an annular brake disc 73. The brake disc 73 includes an outer cylindrical engagement portion 75, which is surrounded by a brake band 77.

Figure 4:
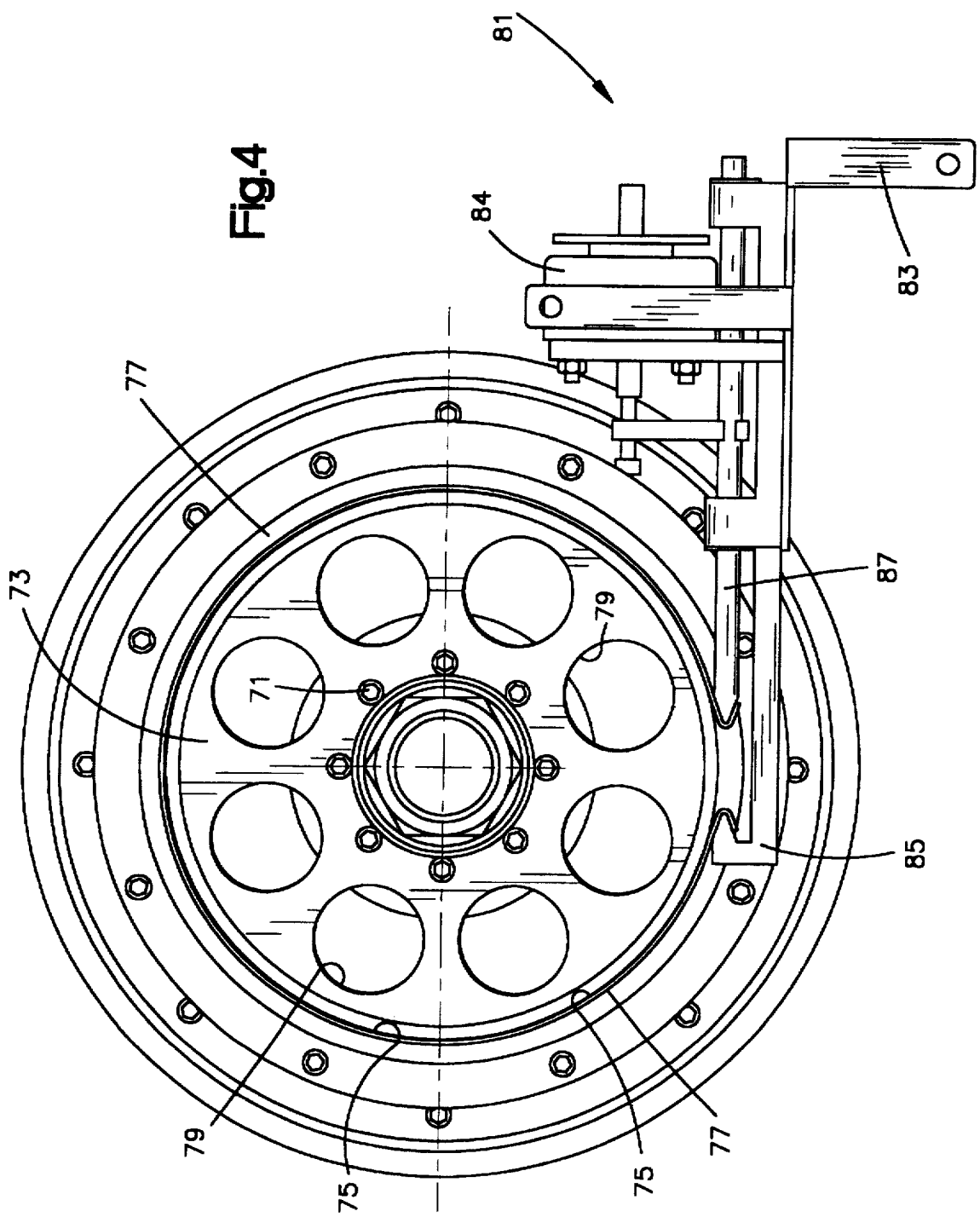
FIG. 4 is a plan view, also taken from the right in FIG. 1, and on about the same scale as FIG. 3, illustrating the actuator utilized with the present invention.

As may best be seen in FIG. 4, the brake disc 73 preferably defines a number of cutout portions 79, to make the disc 73 lighter and to facilitate the flow of cooling air around and through the mechanism. Also shown in FIG. 4 is an actuator assembly, generally designated 81, which would typically be fixed, relative to the vehicle engine, by means of a mounting bracket 83. In the subject embodiment, and by way of example only, the actuator assembly 81 comprises an electromagnetic solenoid 84 which includes a fixed link member 85 engaging one end of the brake band 77, and a moveable actuator member 87 engaging the other end of the brake band 77. When the actuator assembly 81 receives an appropriate electrical input signal at the solenoid 84, the coil within the solenoid 84 is energized, in a manner well known to those skilled in the art, moving the actuator member 87 to the left in FIG. 4, and thus tightening the brake band 77 about the engagement portion 75 of the brake disc 73. Therefore, because the actuator assembly 81 is "grounded" (i.e., attached to the vehicle engine), the brake band 77, the brake disc 73, the annular grounding member 69 and the sun gear 53 are all similarly grounded (i.e., prevented from rotating, relative to the vehicle engine).

Referring now also to FIG. 3, with the input shaft 21 rotating in the clockwise direction (see arrows), and the sun gear 53 grounded, the planet carrier 47 and the carrier pins 49 also rotate in a clockwise direction. With each of the planet gears 55 in toothed engagement with the grounded sun gear 53, and the center of each plant gear 55 rotating clockwise, the result is that the ring gear 59 is driven clockwise, but at a speed which is greater than the speed of rotation of the input shaft 21. In the subject embodiment, and by way of example only, the sun gear 53 has 36 teeth, and the ring gear 59 has 72 teeth, such that the ratio of output speed (i.e., ring gear 59) to input speed (i.e., input shaft 21) is 1.5:1, which is determined by the following ratio:

$$\text{Ratio} = \frac{\text{ring gear teeth} + \text{sun gear teeth}}{\text{ring gear teeth}} = \frac{72 + 36}{72} = \frac{1.5}{1}$$

In accordance with one aspect of the present invention, the speed increasing mechanism 13 does not increase the input speed to the input coupling member 15 of the viscous fan drive 11, but instead, directly drives ("overdrives") the output of the fluid coupling device 11. However, it should be understood by those skilled in the art that within the scope of the present invention, the ring gear 59 may be attached to, and directly drive, any one of the input coupling member 15, the housing member 17, the cover member 19, or the cooling fan F, and references hereinafter, and in the appended claims, to the output portion (ring gear 59) of the planetary gear set being in driving relationship to one of the first and second coupling members will be understood to mean and include any of the above. In the subject embodiment, and by way of example only, the housing member 61 within which the ring gear 59 is disposed, is as described previously, attached to both the housing member 17 and the cooling fan F, whereby a forward wall portion 89 of the housing 61 also serves as the "spider" whereby torque is transmitted from the fan drive housing 17 to the fan F, which is attached to a radially outer portion 91 of the housing 61.

Above a certain predetermined vehicle speed, the electrical input signal to the actuator assembly 81 is discontinued, and the moveable actuator 87 is retracted, thus permitting the brake band 77 to expand, such that the brake disc 73 and grounding member 69 are no longer grounded. In this unactuated condition, with the input shaft 21 still rotating clockwise, the planet carrier 47 still rotates clockwise, but now, the ungrounded sun gear 53 and the ring gear 59 both rotate at generally the same speed of rotation, being in toothed engagement with the planet gears 55. However, with the actuator assembly 81 and the mechanism 13 operating in the unactuated condition, the torque transfer path is from the input shaft 21 to the input coupling member 15, and from there, by means of viscous shear drag to the output of the viscous coupling 11, i.e., the housing member 17 and cover member 19.

As is also well known to those skilled in the art, there is always a certain amount of "slip" in a viscous shear device, such that the output speed of the viscous coupling 11 will be less than the input speed of the shaft 21. Therefore, in the unactuated condition, the input shaft 21 and planet carrier 47 rotate at the same speed, but the speed of rotation of the ring gear 59 is less than that of the input shaft 21, by an amount which is equal to the "slip" within the viscous coupling. It will be understood by those skilled in the art of viscous fan drives that it is desirable to include an arrangement to pump fluid out of the operating chamber 33, and return it to the reservoir chamber 31 in response to the slip speed, as is conventional, and as is illustrated and described in above-incorporated U.S. Pat. No. 4,974,712. However, in the present invention, such a pumping arrangement should be able to pump fluid from the operating chamber to the reservoir chamber whether the input coupling 15 is rotating faster ("normal" operation), or whether the fan drive housing 17 is rotating faster ("overdrive" operation). It is believed to be within the ability of those skilled in the art to design the desired pumping arrangement.

Although the present invention has been illustrated and described in connection with a fluid coupling device 11 which is of the temperature sensing type, and therefore, has a separate fluid operating chamber 33 and fluid reservoir chamber 35, those skilled in the art will recognize that the invention is not so limited. For example, some fan drives are produced which are not temperature sensing, but instead, are merely "torque limiting". In such fan drives, there is only an operating chamber, and the fluid remains in the operating chamber at least throughout the time that the fan drive is rotating.

In addition, although the invention has been described in connection with a planetary gear set as the speed increasing mechanism, those skilled in the gearing art will understand that various other gearing arrangements could be utilized to achieve the objective of overdriving the output of the fan drive, relative to the input, when desired.

ALTERNATE EMBODIMENT—FIG. 5

Figure 5:
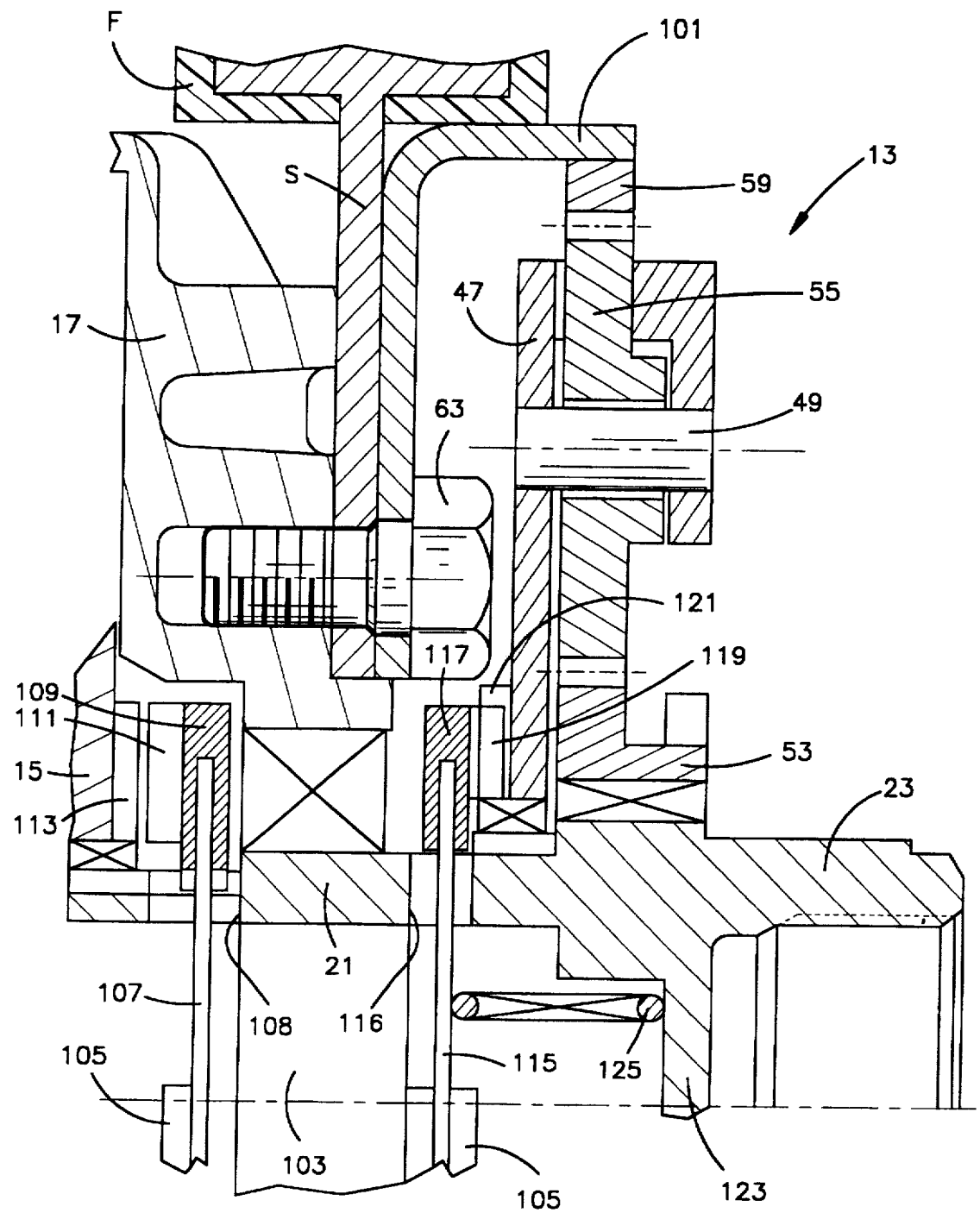
FIG. 5 is an enlarged, fragmentary axial cross-section, similar to FIG. 2, illustrating an alternative embodiment of the present invention.

Referring now primarily to FIG. 5, there is illustrated an alternative embodiment of the present invention, in which elements which are the same or similar to those in the main embodiment bear the same reference numerals and new or substantially modified elements bear reference numerals in excess of "100". For simplicity, the embodiment of FIG. 5 does not include the stamped cover member 67 shown in FIG. 2, and the main housing comprises a stamped housing 101 which is bolted to the body 17, along with a spider S of the cooling fan F.

In the embodiment of FIG. 5, the input shaft 21 is somewhat enlarged, by comparison to the embodiment of FIG. 1, and is hollow, to permit the insertion therein of an electromagnetic solenoid 103. Extending axially out of the solenoid 103 is an armature member 105, and on the forward end thereof (to the left in FIG. 5) is a plurality of radially extending members 107, passing through openings 108 in the shaft 21, and having a clutch member 109 disposed about the outer periphery of the members 107. The clutch member 109 includes a plurality of forwardly extending clutch teeth 111 which are disposed to engage a mating set of clutch teeth 113 formed on the rearward surface of the input coupling member 15.

Disposed on the rearwardly extending portion of the armature member 105 is an a plurality of radially extending members 115, passing through openings 116 in the shaft 21, and having a clutch member 117 disposed about the outer periphery of the members 115. Formed on a rearward surface of the clutch member 117 is a plurality of clutch teeth 119, the teeth 119 being shown in FIG. 5 in engagement with a set of clutch teeth 121 formed on a forward surface of the planet carrier 47.

The input shaft 21 includes a spring seat portion 123, and seated thereagainst is a coiled spring member 125, normally biasing the armature 105 and the members 107 and 115 toward a "forward" position in which the clutch teeth 111 are in engagement with the clutch teeth 113. This is the unactuated or de-energized condition of the solenoid 103, whereby drive torque is transmitted through the input shaft 21 to the input coupling member 15, and the fan drive operates in its normal viscous shear mode, i.e., assuming that there is fluid in the operating chamber. In this unactuated or de-energized condition of the solenoid 103, the clutch teeth 119 and 121 are out of engagement, such that no torque is being transmitted to the planet carrier 47. When, for example, the engine speed is relatively low, the solenoid 103 is energized, moving the armature 105 and members 107 and 115, overcoming the bias of the spring 125, to the position shown in FIG. 5 in which the clutch teeth 111 and 113 are out of engagement and the clutch teeth 119 and 121 are in engagement. In this energized position, input torque is transmitted by means of the input shaft 21 to the planet carrier 47, to "overdrive" the housing 101, housing member 17, and the cooling fan F, in the same manner as was described in connection with the FIG. 1 embodiment.

The important aspect of the FIG. 5 embodiment is that, with the solenoid 103 energized, and the clutch teeth 111 and 113 disengaged, and no torque is transmitted from the input shaft 21 to the input coupling member 15. Thus, and especially on relatively larger fan drives, no input torque is being wasted in an attempt to rotate the input coupling member 15, and overcome the viscous shear drag between the member 15 and the housing member 17, which is, at this time, being driven faster than the input member 15.

ALTERNATIVE EMBODIMENT—FIG. 6

Referring now primarily to FIG. 6, another alternative embodiment of the invention will be described, in which like elements bear like numerals, and new or substantially modified elements bear reference numerals in excess of "200". In the embodiment of FIG. 6, the speed increasing mechanism 13 is internal to the fluid coupling device 11, the primary objective of the FIG. 6 embodiment being a smaller, simpler, and more compact device.

The embodiment of FIG. 6 is preferably a "front land and groove" fluid coupling on which the lands and grooves are formed on a "forward" surface of the input coupling member 201, and are in interdigitated relationship with lands and grooves formed on a rearward surface of the cover member 203. The input shaft 21 is in fixed, driving relationship with the input coupling member 201, in the normal manner. Surrounding the forward portion of the input shaft 21 is a sun gear bearing 204, and rotatably supported thereon is the sun gear 53. The sun gear 53 of the FIG. 6 embodiment has integrally formed therewith a cylindrical grounding portion 205, which extends rearwardly a sufficient distance to permit engagement, for purposes of grounding the sun gear 53, in the manner described in connection with the embodiment of FIG. 1.

It is one important feature of the embodiment of FIG. 6 that the input coupling member 201 serves as the planet carrier for the speed increasing mechanism, such that the planet carrier pins 207 are attached to the input member 201, or are formed integrally therewith as shown in FIG. 6, and the carrier pins 207 have the planet gears 55 rotatably mounted thereon. The coupling device of FIG. 6 includes a housing member 209, which also serves to support a ring gear 211 of the planetary gear set. Ring gear teeth are formed about the inner periphery of the ring gear 211, and are in engagement with the teeth of the planet gears 55.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A fluid coupling device of the type including a first rotatable coupling member defining an axis of rotation, and a fluid chamber therein comprising a fluid operating chamber, a second rotatable coupling member disposed in said fluid operating chamber and being rotatable relative to said first coupling member, to transmit torque thereto in response to the presence of viscous fluid in said fluid operating chamber, an input means in driving relationship with said second coupling member, and operable to transmit input torque thereto, characterized by:
   (a) speed increasing gear means including an input portion in driven relationship with said input means;
   (b) said speed increasing gear means further including an output portion in driving relationship to said first rotatable coupling member;
   (c) actuation means for said speed increasing gear means having a first, actuated condition in which said speed increasing gear means transmits input torque from said input means to said first rotatable coupling member at a speed of rotation greater than that of said input means; and, (d) said actuation means having a second, unactuated condition in which substantially all input torque is transmitted from said input means to said second rotatable coupling member.

2. A fluid coupling device as claimed in claim 1, characterized by cover means associated with said first rotatable coupling member to define therebetween said fluid chamber, and valve means disposed to separate said fluid chamber into said fluid operating chamber and a fluid reservoir chamber.

3. A fluid coupling device as claimed in claim 1, characterized by said valve means including a valve plate separating said fluid operating chamber and said fluid reservoir chamber, said valve plate defining a fluid port adapted to permit fluid communication between said operating chamber and said reservoir chamber.

4. A fluid coupling device as claimed in claim 3, characterized by said valve means further including valve means moveable, in response to variations in a predetermined condition, between a first position substantially preventing fluid flow through said fluid port, and a second position permitting substantial fluid flow through said fluid port.

5. A fluid coupling device as claimed in claim 4, characterized by said predetermined condition comprising an external temperature representative of engine coolant temperature.

6. A fluid coupling device as claimed in claim 1, characterized by said speed increasing gear means comprises a planetary gear set including a sun gear, a ring gear, and a plurality of planet gears disposed radially between said sun gear and said ring gear.

7. A fluid coupling device as claimed in claim 6, characterized by said planetary gear set includes a planet carrier having an axis coincident with said axis of rotation, each of said planet gears being disposed to rotate about an axis fixed to said planet carrier, said planet carrier comprising said input portion.

8. A fluid coupling device as claimed in claim 6, characterized by said output portion comprising said ring gear, and a gear housing being rotatably fixed relative to said ring gear and said first rotatable coupling member.

9. A fluid coupling device as claimed in claim 8, characterized by said gear housing including a radially inner portion fixed to said first rotatable coupling member, a radially intermediate portion fixed to said ring gear, and a radially outer portion adapted to have a cooling fan attached thereto.

10. A fluid coupling device as claimed in claim 6, characterized by said sun gear being disposed in surrounding relationship to said input means, said actuation means comprising brake means operably associated with said sun gear, said first, actuated condition comprising said brake means being engaged to prevent rotation of said sun gear, and said second, unactivated condition comprising said brake means being disengaged to permit rotation of said sun gear.

11. A fluid coupling device as claimed in claim 1, characterized by said speed increasing gear means being disposed internally of said first rotatable coupling member, and said second rotatable coupling member comprises said input portion to said speed increasing gear means.

12. A fluid coupling device as claimed in claim 1, characterized by said speed increasing gear means being disposed externally of said first rotatable coupling member.

13. A fluid coupling device as claimed in claim 1, characterized by said actuation means comprises clutch means having said first, actuated condition providing clutching engagement of said input means to said input portion of said speed increasing gear means, and said clutch means having said second, unactuated condition in which said input means is disengaged from said input portion.

14. A fluid coupling device as claimed in claim 13, characterized by said clutch means, in said first actuated condition, disengages said second rotatable coupling member from said input means, and in said second, unactuated condition, provides clutching engagement of said second rotatable coupling member to said input means.

15. A fluid coupling device of the type including a first rotatable coupling member defining an axis of rotation, and a fluid chamber therein comprising a fluid operating chamber, a second rotatable coupling member disposed in said fluid operating chamber and being rotatable relative to said first coupling member, to transmit torque thereto in response to the presence of viscous fluid in said fluid operating chamber, an input means in driving relationship with said second coupling member, and operable to transmit input torque thereto, characterized by:
   (a) speed increasing gear means including an input portion in driven relationship with said input means;
   (b) said speed increasing gear means further including an output portion in driving relationship to one of said first and second rotatable coupling members;
   (c) actuation means for said speed increasing gear means having a first, actuated condition in which said speed increasing gear means transmits input torque from said input means to said one of said first and second rotatable coupling members at a speed of rotation greater than that of said input means; and, (d) said actuation means having a second, unactuated condition in which substantially all input torque is transmitted from said input means to said second rotatable coupling member, at substantially the speed of rotation of said input means.

16. A fluid coupling device as claimed in claim 15, characterized by cover means associated with said first rotatable coupling member to define therebetween said fluid chamber, and valve means disposed to separate said fluid chamber into said fluid operating chamber and a fluid reservoir chamber.

17. A fluid coupling device as claimed in claim 15, characterized by said valve means including a valve plate separating said fluid operating chamber and said fluid reservoir chamber, said valve plate defining a fluid port adapted to permit fluid communication between said operating chamber and said reservoir chamber.

18. A fluid coupling device as claimed in claim 17, characterized by said valve means further including valve means moveable, in response to variations in a predetermined condition, between a first position substantially preventing fluid flow through said fluid port, and a second position permitting substantial fluid flow through said fluid port.

19. A fluid coupling device as claimed in claim 18, characterized by said predetermined condition comprising an external temperature representative of engine coolant temperature.

20. A fluid coupling device as claimed in claim 15, characterized by said speed increasing gear means comprises a planetary gear set including a sun gear, a ring gear, and a plurality of planet gears disposed radially between said sun gear and said ring gear.

21. A fluid coupling device as claimed in claim 20, characterized by said planetary gear set includes a planet carrier having an axis coincident with said axis of rotation, each of said planet gears being disposed to rotate about an axis fixed to said planet carrier, said planet carrier comprising said input portion.

22. A fluid coupling device as claimed in claim 20, characterized by said output portion comprising said ring gear, and a gear housing being rotatably fixed relative to said ring gear and said first rotatable coupling member.

23. A fluid coupling device as claimed in claim 22, characterized by said gear housing including a radially inner portion fixed to said first rotatable coupling member, a radially intermediate portion fixed to said ring gear, and a radially outer portion adapted to have a cooling fan attached thereto.

24. A fluid coupling device as claimed in claim 20, characterized by said sun gear being disposed in surrounding relationship to said input means, said actuation means comprising brake means operably associated with said sun gear, said first, actuated condition comprising said brake means being engaged to prevent rotation of said sun gear, and said second, unactivated condition comprising said brake means being disengaged to permit rotation of said sun gear.

25. A fluid coupling device as claimed in claim 15, characterized by said speed increasing gear means being disposed externally of said first rotatable coupling member.

26. A fluid coupling device as claimed in claim 15, characterized by said actuation means comprises clutch means having said first, actuated condition providing clutching engagement of said input means to said input portion of said speed increasing gear means, and said clutch means having said second, unactuated condition in which said input means is disengaged from said input portion.

* * * * *